United States Patent [19]

Wakeman

[11] 4,120,150
[45] Oct. 17, 1978

[54] COMPACT FUEL-TO-AIR HEAT EXCHANGER FOR JET ENGINE APPLICATION

[75] Inventor: Thomas G. Wakeman, West Chester, Ohio

[73] Assignee: The United States of America as represented by the Secretary of the Air Force, Washington, D.C.

[21] Appl. No.: 797,669

[22] Filed: May 17, 1977

[51] Int. Cl.² ............................ F02C 7/18; F02C 7/22
[52] U.S. Cl. .............................. 60/39.09 R; 60/39.66; 60/39.71
[58] Field of Search ................. 60/226 R, 39.66, 267, 60/39.71, 39.09 R

[56] References Cited

U.S. PATENT DOCUMENTS

| 2,970,437 | 2/1961 | Anderson | 60/39.66 |
| 3,377,803 | 4/1968 | Prachar | 60/39.66 |
| 3,486,340 | 12/1969 | DuPont et al. | 60/39.66 |
| 3,528,250 | 9/1970 | Johnson | 60/39.66 |
| 3,734,639 | 5/1973 | Short | 60/39.66 |
| 3,777,489 | 12/1973 | Johnson et al. | 60/226 R |

FOREIGN PATENT DOCUMENTS 899,312  6/1962  United Kingdom .................. 60/39.66

Primary Examiner—Robert E. Garrett
Attorney, Agent, or Firm—Joseph E. Rusz; Arsen Tashjian

[57] ABSTRACT

A structurally compact fuel-to-air heat exchanger, for a gas turbine engine, that permits a lower percentage of cooling air, than is presently needed in the art, to cool effectively the hot turbine, and its parts, of the engine. The heat exchanger includes: a plurality of flow tubes through which cool combustor fuel flows, with the flow tubes in a crossflow relationship with and to the hot flow of cooling air; an air manifolding and flow-directing system; and, a fuel manifolding and flow-directing system. The heat exchanger is uniquely disposed internal of the gas turbine engine, within the fire safe cavity, which is ventilated.

5 Claims, 7 Drawing Figures

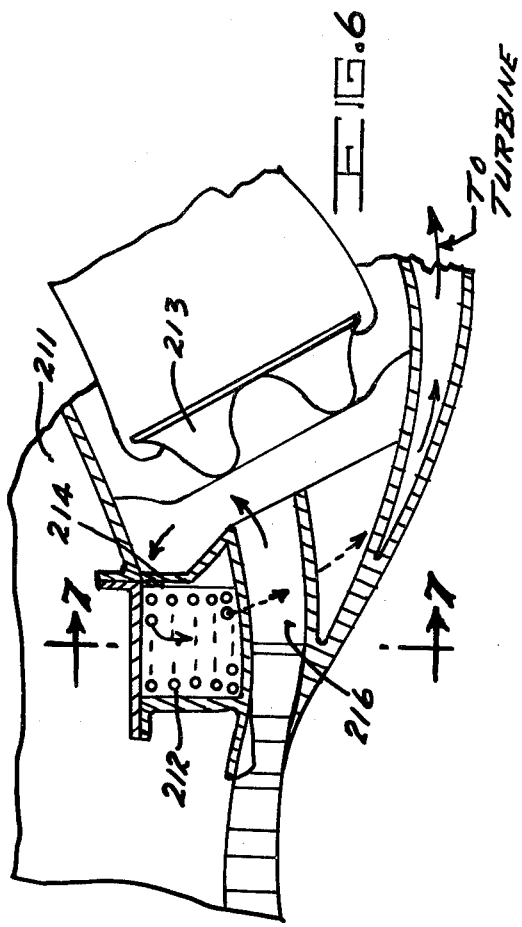
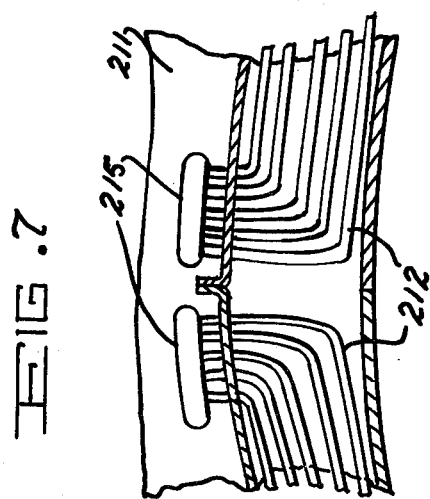
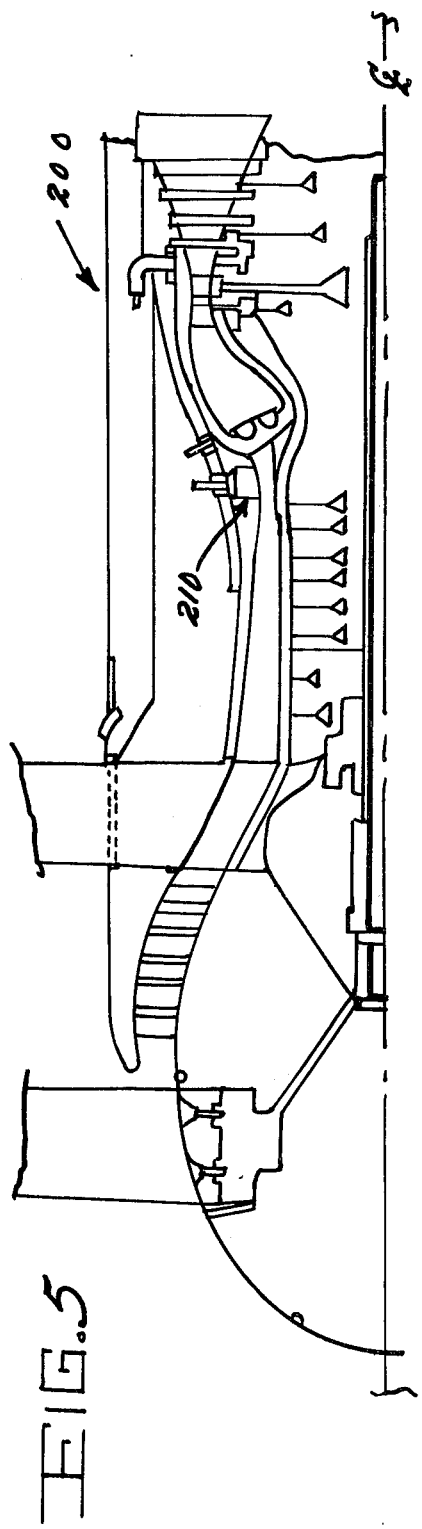

4,120,150

COMPACT FUEL-TO-AIR HEAT EXCHANGER FOR JET ENGINE APPLICATION

STATEMENT OF GOVERNMENT INTEREST

The invention described herein may be manufactured and used by or for the Government for governmental purposes without the payment of any royalty thereon.

BACKGROUND OF THE INVENTION

This invention relates to the heat exchanger art and, more particularly, to a compact fuel-to-air heat exchanger, adapted for use with and in a gas turbine engine.

It is well known in the art that, as the gas turbine engine combustor exit temperatures are increased toward stoichiometric, a larger percentage of engine air is required to cool the hot turbine and its parts. It is equally well known in the art that, as higher Mach numbers are attained, and as larger compressor ratios are achieved, with gas turbine engines, the temperature of the compressor discharge air (hereinafter referred to herein, as it is in the art, as the "cooling air" of the engine) is driven to well above 1000° Fahrenheit. Since this cooling air is used to cool the high pressure turbine and its parts, the high temperature of the cooling air also tends to increase the percentage of engine air that is required to cool the turbine and its parts. Therefore, there exists in the art the problem of reducing the total percentage of cooling air that is required to cool the turbine, and the parts thereof, of the gas turbine engine.

Although, if a fuel-to-air heat exchanger is to be used in a gas turbine engine, fire prevention is another inherent problem, because if fuel leaks into the cooling air (which is at high pressure and at high temperature), a fire is almost assured.

I have solved, or at least have minimized, these two problems (i.e., the need for an increased total percentage of cooling air to cool the turbine and its parts, and fire safety when a fuel-to-air heat exchanger is used) by devising a structurally compact and novel fuel-to-air heat exchanger which I uniquely dispose internal of the gas turbine engine, with my heat exchanger not only being "fire-safe" (for all practical purposes and considerations), but also permitting, by its use in the engine, a lesser total percentage of cooling air (than is presently needed) to cool the hot turbine and its parts.

I have, therefore, significantly advanced the state-of-the-art.

SUMMARY OF THE INVENTION

My invention pertains to a structurally compact fuel-to-air heat exchanger, adapted for use in a gas turbine engine having a hot flow of cooling air, a combustion section (hereinafter referred to as a "combustor section") with a combustion chamber (hereinafter referred to as a "combustor"), a combustor dome, and a diffuser, and having a fire safe cavity in communication with the combustor, and also having a cool flow of fuel for the combustor, whereby the flow of cool combustor fuel acts as a heat sink, cools the hot cooling air, and results in the need and use of a lesser percentage of cooling air (than was needed in the prior art) to cool the hot turbine and its parts. In addition, fire safety is promoted and is maintained by and with the use (in combination with my fuel-to-air heat exchanger) of novel means for ventilating the fire safety cavity.

Accordingly, the principal object of this invention is to teach the novel structure, and the unique positioning to the gas turbine engine, of a preferred embodiment of my fuel-to-air heat exchanger.

This principal object, as well as other related objects (e.g., teaching and providing for novel air manifolding and flow directing means, and fuel manifolding and flow directing means, and also means for ventilating the fire safe cavity) of this invention will become readily apparent after a consideration of the invention, coupled with reference to the Figures of the drawings.

DESCRIPTION OF THE DRAWINGS

FIG. 5 is a side elevation view of another gas turbine engine in simplified cross sectional form, partially pictorial, partially schematic, and partially fragmented, showing internal thereof a variation of the preferred embodiment of my inventive heat exchanger;

FIG. 6 is a side elevation view, in cross sectional and simplified form, and also enlarged and in detail, of the variation of my invention shown in FIG. 5; and FIG. 7 is a view taken along the line 7—7 in FIG. 6.

DESCRIPTION OF THE PREFERRED EMBODIMENT

Figure 1:
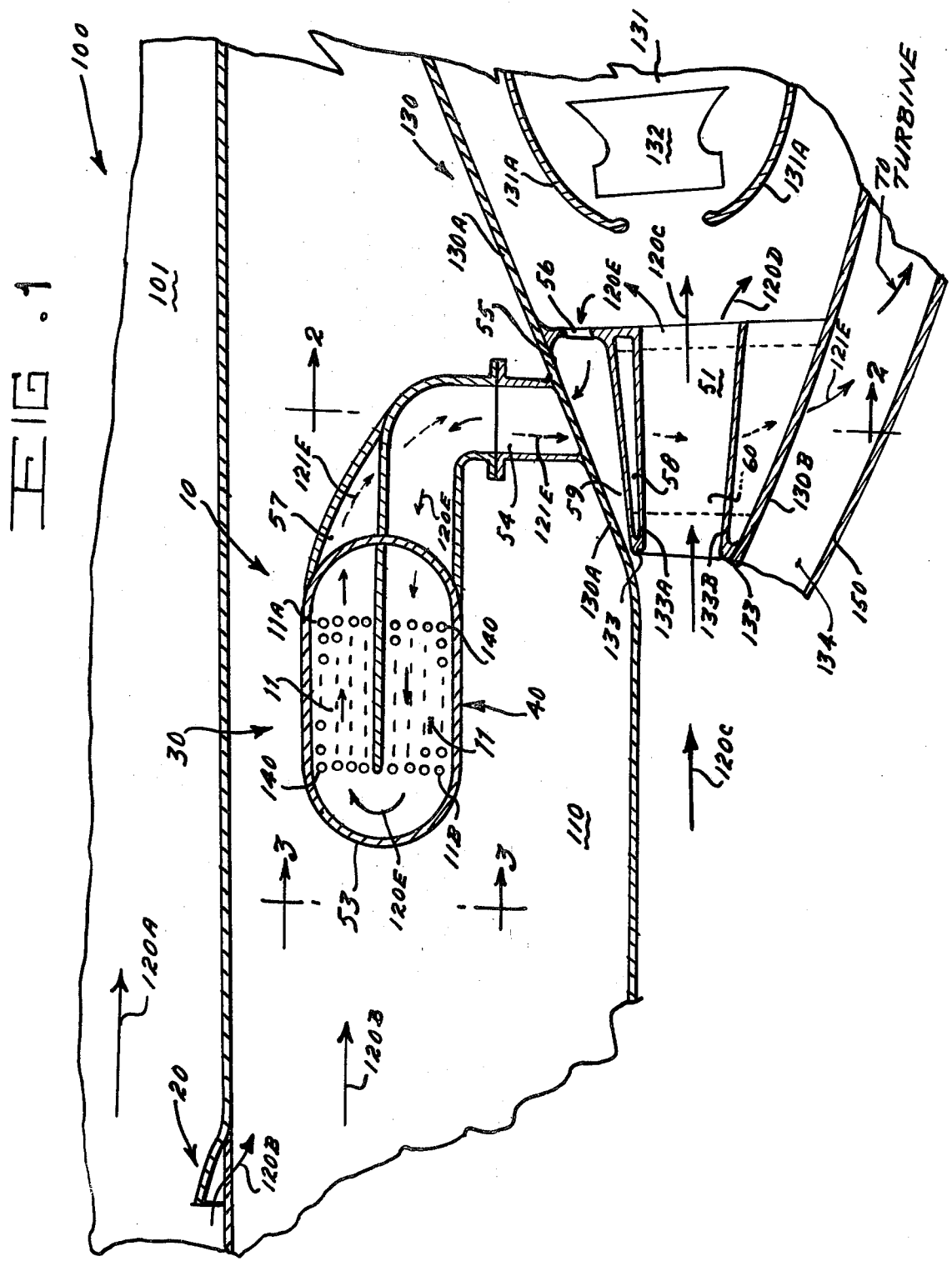
FIG. 1 is a side elevation view, in simplified cross sectional form, partially schematic, partially pictorial, and partially fragmented of a gas turbine engine and of a preferred embodiment of my inventive heat exchanger, positioned uniquely in its environment within the gas turbine engine.

With reference to FIG. 1, therein is shown, in simplified form, a preferred embodiment, generally designated 10, of my invention, positioned uniquely in its environment within the gas turbine engine 100.

It is here to be noted that my invention 10 is adapted for use with and in a gas turbine engine, such as 100, in combination with means 20 for ventilating the fire safety cavity 110 of the gas turbine engine 100. It is also to be noted: that the gas turbine engine 100 has a hot flow of cooling air, with constituent portions of that flow being generally designated 120A, 120B and 120C and also indicated by directional arrows; that the engine 100 also has a combustor section 130 with a combustor 131, a combustor dome 132; and that the engine 100 further has a diffuser 133, the above-mentioned fire safe cavity 110 in communication with the combustor section 130, and a cool flow of fuel for and to the combustor 131, with representative portions of the fuel flow generally designated 140.

In its most basic and generic form, the preferred embodiment 10 of my inventive fuel-to-air heat exchanger, as adapted for use with a gas turbine engine 100, is structurally compact (i.e., concentrated) so that it fits within, and in fact is uniquely disposed within, the fire safe cavity 110 of the representative engine 100, and comprises: means, such as 20 (a scoop), for ventilating the fire safe cavity 110 of the engine 100; means, generally designated 30, for cooling the hot flow of cooling air, such as 120B; and, means, generally designated 40, for heating the cool flow of combustor fuel, such as 140, in association with the cooling air 120B cooling means 30.

Still with reference to FIG. 1, the means for cooling 30 and the means for heating 40 include, in common, a plurality of flow tubes 11, such as representative ones 11A and 11B, through which the combustor fuel 140 flows, with the flow tubes, such as 11A and 11B, disposed in a cross flow relationship with (i.e., are transverse to) the hot flow of cooling air, such as 120E, and with the fuel flow tubes 11 having a common fuel flow inlet manifold and a common fuel flow outlet manifold (not shown in FIG. 1, but to be shown later herein).

Again with reference to FIG. 1, it is to be noted that the structurally compact heat exchanger 10 is (and, more accurately, the fuel flow tubes 11 thereof, such as 11A and 11B, are) also simultaneously disposed near the combustor dome 132 and the diffuser 133.

Still with reference to FIG. 1, also shown (together with components, members, elements and the like to be identified and described later herein) are: outward combustor section casing 130A; inner combustor section casing 130B; cooling air duct 101; combustor section inlet 51; exhaust air hollow struts 60; a duct 134 to the turbine and its parts; and, the rotor drum 150 of the turbine.

Figure 2:
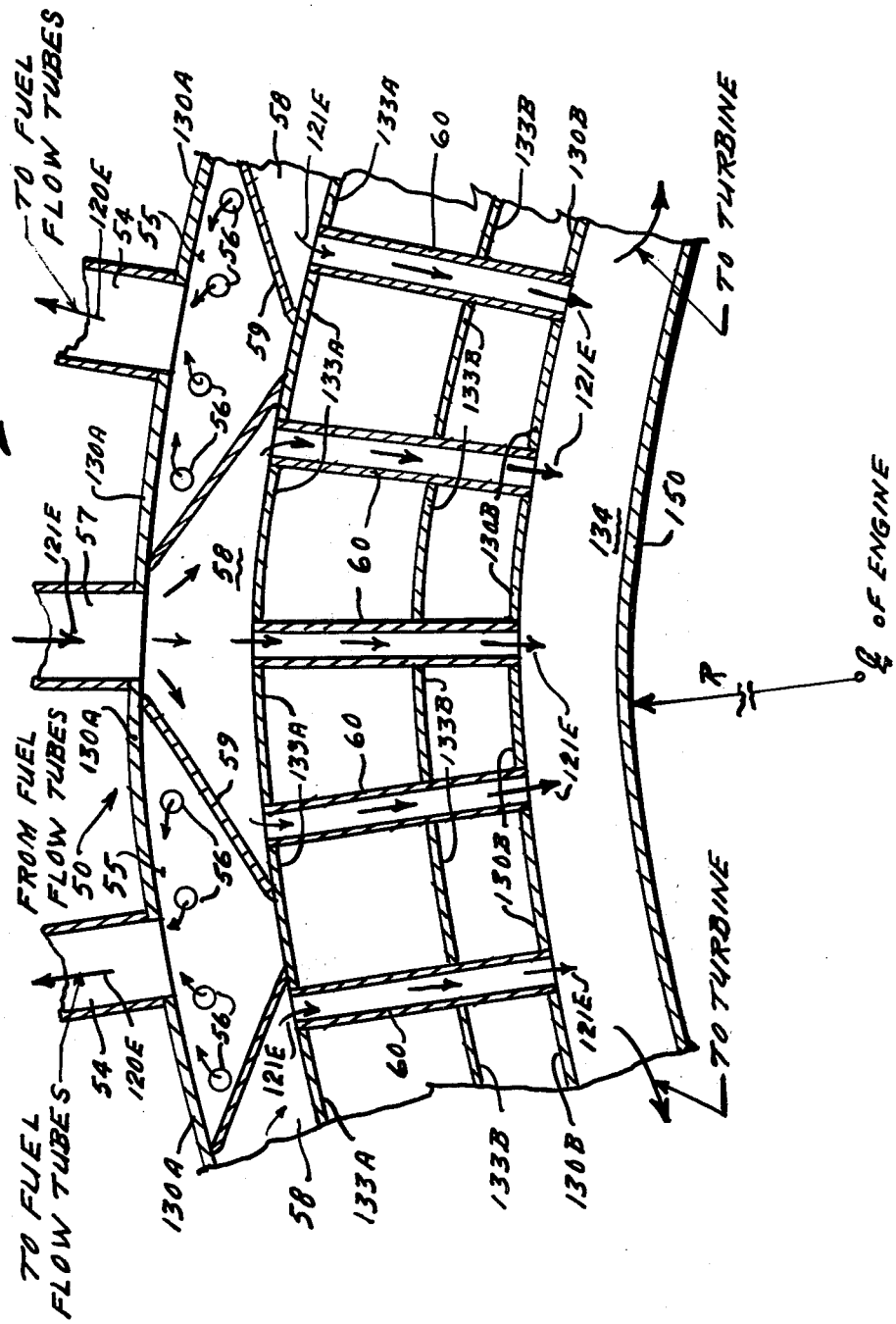
FIG. 2 is a view taken along the line 2—2 in FIG. 1.

With reference to FIG. 2, therein is shown, in simplified schematic form, what is viewed along line 2—2 in FIG. 1. What is, in fact, shown in FIG. 2 is my unique means 50 for manifolding, and for directing the flow of, the hot flow of cooling air 120C, FIG. 1, and the resultant exhaust flow of cooled cooling air 121E, FIG. 1, which said cooling air manifolding and flow-directing means 50 also comprises a constituent portion of my novel fuel-to-air heat exchanger 10, FIG. 1.

My air manifolding and flow-directing means 50 includes: an inlet, such as 51, FIG. 1, in the combustor section 130, FIG. 1, into which and through which a hot flow of cooling air, such as 120C, FIG. 1, enters; means (generally designated 52, FIG. 1), associated with the inlet 51, for diverting a portion such as 120E, FIG. 1, of the hot flow 120C of entering air; a casing 53, FIG. 1, housing the plurality 11 of combustor fuel flow tubes, such as 11A and 11B; a first plurality of conduits 54, FIGS. 1 and 2 (i.e., entry pipes) leading from the diverting means 52 to the casing 53, and connected to the diverting means and the casing, to direct the diverted portion 120E, FIG. 1, of the hot flow of cooling air 120C, FIG. 1, to the casing, and to the plurality 11 of combustor fuel flow tubes, such as 11A and 11B, that are housed therein, to cool the diverted portion 120E of the hot flow 120C; a plurality of air manifolds 55, FIGS. 1 and 2, interposed between, and connected to, the diverting means 52 and the first plurality of conduits 54, with one air manifold for each conduit, and with each manifold having a plurality of intake air holes 56, FIGS. 1 and 2, therein through which flows the diverted portion 120E of the hot flow of cooling air 120C from the diverting means to the respective air manifold; a second plurality of conduits 57, FIG. 2 (i.e., return air pipes) connected to and leading from the casing 53, FIG. 1 (and, of course, also leading from the plurality 11 of combustor fuel flow tubes, such as 11A and 11B, housed within the casing 53), with each return air pipe 57 leading to a plenum chamber 58, FIGS. 1 and 2, defined by a baffle 57, FIGS. 1 and 2, and a wall 133A (i.e., the "upper" wall), FIGS. 1 and 2, of the diffuser 133; and, a third plurality of conduits 60, FIGS. 1 and 2 (preferably in the form of hollow struts) connected to and leading from said plenum chambers 58, FIGS. 1 and 2, through the diffuser 133, FIG. 1 (and, of course, diffuser walls 133A and 133B, FIGS. 1 and 2) and into a duct 134, FIGS. 1 and 2, defined by a combustor casing 130B, FIGS. 1 and 2, and a rotor drum 150, FIGS. 1 and 2, with the duct 134 leading, as labeled, to the hot turbine (not shown) and the hot parts thereof (not shown), of the engine 100.

Figure 3:
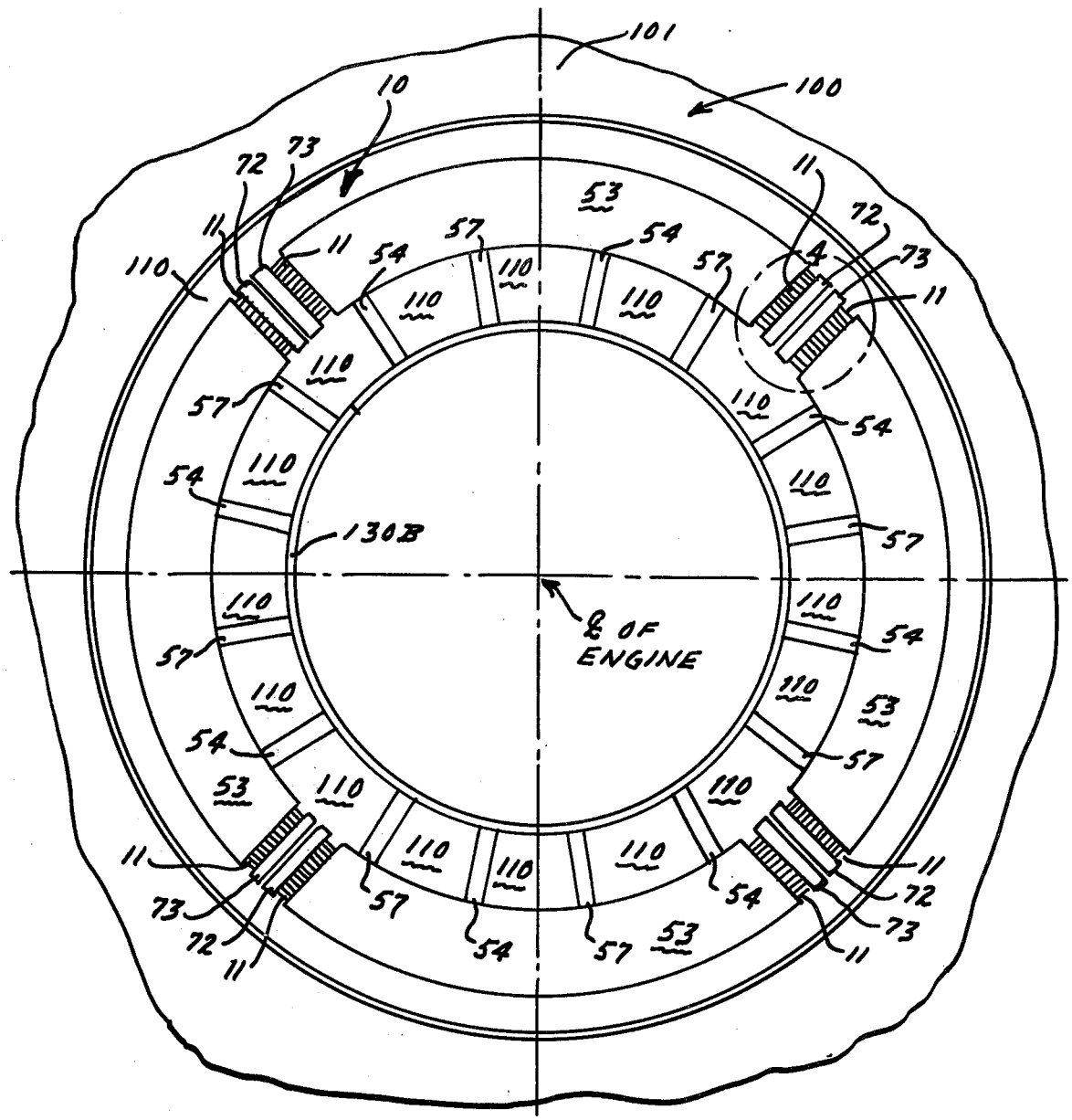
FIG. 3 is a view taken along the line 3—3 of FIG. 1.

With reference to FIG. 3, therein is shown in simplified schematic form, what is seen as viewed along line 3—3 in FIG. 1. In essence, shown herein are: an engine air duct 101 (see also FIG. 1); the casing 53 (see also FIG. 1) of my air manifolding and flow directing means 50, FIGS. 1 and 2, of my preferred embodiment 10; the plurality of combustor fuel flow tubes 11 having a common fuel flow inlet manifold, such as 72, and a common fuel flow out manifold, such as 73, previously referred to herein, which said manifolds 72 and 73 comprise a portion of my means 70 for manifolding, and for directing the flow of, the combustor fuel 140 (see also FIG. 1); the fire safe cavity 110 (see also FIG. 1); the first plurality 54 of air intake pipes (see also FIGS. 1 and 2) of the air manifolding means 50; the second plurality 57 of air exhaust pipes (see also FIGS. 1 and 2) of the air manifolding means 50; and, combustor section casing 130B (see also FIGS. 1 and 2).

It is to be noted that it is preferred, as shown in this FIG. 3, that the heat exchanger 10 be in the form of four identical, interconnected, arcuate, and individually replaceable modules, such as labelled A, B, C and D, of 90 degrees each, although of course the heat exchanger can be configurated in an endless annular form of 360°.

Figure 4:
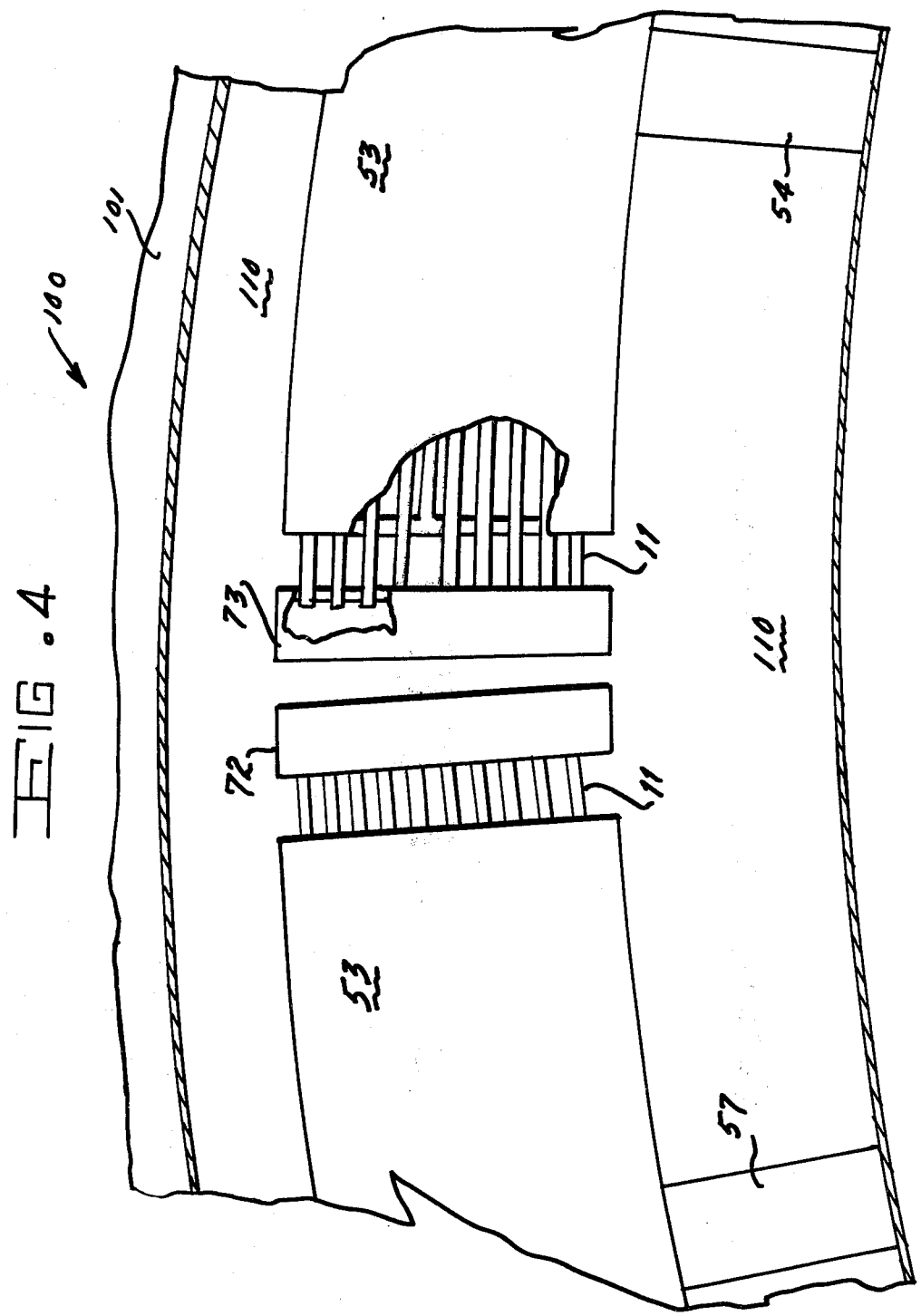
FIG. 4 is a view taken along the circular line 4 in FIG. 3.

Now, with reference to FIG. 4, shown therein, in simplified schematic form, partially fragmented, and enlarged and in detail, is what enclosed within circular line 4 in FIG. 3. Shown, from the outward location in the engine 100 inwardly, are: the air duct 101 (FIGS. 1 and 3), the fire safe cavity 110 (FIGS. 1 and 3); portions of two of the plurality, preferably four, of the casings 53 (FIGS. 1 and 3), with each casing 53 housing a plurality of combustor fuel flow tubes 11 (FIGS. 1 and 3), with each plurality of fuel flow tubes 11, having two ends and also having a common fuel inlet manifold 72 (FIG. 3) at one end, and further having a common fuel outlet manifold 73 (FIG. 3) at the other end; one of the first plurality 54 of air intake pipes (FIGS. 1, 2 and 3); and one of a second plurality 57 of air exhaust pipes (FIGS. 1, 2 and 3).

With reference to FIG. 5, therein is shown, in simplified form, another gas turbine engine 200, internal of which is positioned a variation 210 of the preferred embodiment of my inventive fuel-to-air heat exchanger.

Now, with reference not only to FIG. 5 but also to FIG. 6 which is an enlarged and detailed view of the invention variation 210, and also to FIG. 7 which is a view taken along line 7—7 in FIG. 6, it is to be noted that this variation 210 is uniquely disposed so that, in effect and unlike the preferred embodiment 10, air piping (i.e., air manifolding and flow directing means) is not needed, although like the preferred embodiment 10 it is positioned within the fire safe cavity 211, FIGS. 6 and 7. The tube array 212, FIGS. 6 and 7, carries the combustor fuel flow that acts as a heat sink to cool the hot flow of cooling air.

Also shown in FIGS. 6 and 7 are: the combustor dome 213, FIG. 6; the plurality of air inlet holes 214, FIG. 6, to the tube array 212, FIGS. 6 and 7; the fuel manifolds 215, FIG. 7; the hollow struts 216, FIG. 6; and, arrows, FIG. 6, showing the flow of air into the area of the tube array 212 and, finally, to the turbine, so labeled.

MANNER OF OPERATION OF THE PREFERRED EMBODIMENT

The manner of operation of the preferred embodiment 10, and of the variation thereof 210, can be ascertained by a person of ordinary skill in the art from the foregoing description, together with reference to the Figures of the drawings.

For others, the following simplified explanation is considered sufficient.

Cooling air, such as 120C, is split off into 120D and 120E and passes through a plurality of intake air holes 56 and into an air manifold and flow directing means 55 formed, in part, by combustor section casing 130A and baffle 59. The air is then directed, through a plurality of lead-in pipes 54, to the plurality of fuel flow tubes 11, where the air makes multiple passes through the tubes 11, is cooled, and is returned to the air manifolding and flow directing means 55 through a plurality of return air pipes 57. The air flow discharges from the pipes 57 into plenum chambers 58 formed individually by baffles 59 and diffuser wall 133A. The cooled air 121E then passes through the diffuser 133, by way of hollow struts 60, and into a duct 134 formed by the combuster section casing 130B and the rotor drum 150, from which duct 134 the cooled cooling air 121E flows into the turbine, as labeled in FIG. 1.

CONCLUSION

It is abundantly clear from all of the foregoing, and from the contents of the Figures of the drawings, that the stated principal object, as well as other related objects, of my invention have been attained.

It is to be noted that, although there have been described the fundamental and unique features of my invention as applied to a particular preferred embodiment and a variation thereof, various other embodiments, adaptations, substitutions, additions, omissions, and the like, may occur to, and can be made by, those of ordinary skill in the art, without departing from the spirit of my invention.

What is claimed is:

1. A compact fuel-to-air heat exchanger, in combination with a gas turbine engine having: a hot flow of cooling air; an air duct in communication with said hot flow of cooling air; a combustor section also in communication with said hot flow of cooling air and having a combustor, a combustor dome, a diffuser, and an outward combustor section casing, wherein said outward combustor section casing and said air duct define a fire safety cavity; means, disposed between said air duct and said defined fire safe cavity, for ventilating said fire safe cavity; and, a cool flow of fuel for and to said combustor; wherein said heat exchanger is disposed internal of said gas turbine engine and within said ventilated and defined fire safe cavity, and also is simultaneously disposed near said combustor dome and said diffuser, and wherein said heat exchanger comprises:
   a. means for cooling said hot flow of cooling air;
   b. means for heating said cool flow of combustor fuel, with this said means in association with said cooling air cooling means;
   wherein said means for cooling and said means for heating include, in common, a plurality of flow tubes through which said combustor fuel flows, with said flow tubes disposed in a crossflow relationship with and to said hot flow of cooling air, and with said fuel flow tubes having a common fuel inlet manifold and a common fuel outlet manifold; and whereby heat is transferred from said hot flow of cooling air to said cool flow of combustor fuel, thereby resulting in an exhaust flow of cooled cooling air;
   c. and, means for manifolding, and for directing flow of, said hot flow of cooling air and said exhaust flow of cooled cooling air, wherein said cooling air manifolding and flow-directing means includes:
      (1) an inlet, in said combustor section, into which said hot flow of cooling air enters;
      (2) means, associated with said inlet, for diverting a portion of said hot flow of entering cooling air;
      (3) a casing, housing said plurality of combustor fuel flow tubes;
      (4) a first plurality of conduits, leading from said diverting means to said casing, and connected to said diverting means and said casing, to direct said diverted portion of hot flow of cooling air to said casing, and to said plurality of combustor fuel flow tubes housed therein, whereby said diverted portion of said hot flow of cooling air is cooled;
      (5) a plurality of air manifolds interposed between and connected to said diverting means and said first plurality of conduits, with one air manifold for each conduit, wherein each air manifold has a plurality of intake air holes therein through which flows said diverted portion of hot flow of cooling air from said diverting means to said air manifold;
      (6) a second plurality of conduits, connected to and leading from said casing, to direct and to exhaust said cooled diverted portion of cooling air flow from said casing, and from said plurality of combustor fuel flow tubes housed therein, to a plurality of plenum chambers, with one plenum chamber for each conduit of said second plurality, wherein each plenum chamber is defined by a baffle and a wall of said diffuser;
      (7) and, a third plurality of conduits, connected to and leading from said plenum chambers through said diffuser and into a duct defined by a casing for said combustor section and a rotor drum, with said duct leading to said hot turbine and said hot turbine parts, whereby said cooled diverted portion of cooling air flow is directed from said plenum chambers to said hot turbine and hot turbine parts.

2. A compact fuel-to-air heat exchanger, as set forth in claim 1, wherein said third plurality of conduits comprises a plurality of hollow struts.

3. A compact fuel-to-air heat exchanger, as set forth in claim 2, wherein said heat exchanger also comprises a means for manifolding and for directing the flow of said combustor fuel, wherein this said means is disposed external of, and removed from, said hot flow of cooling air and is also simultaneously disposed within said ventilated fire safe cavity.

4. A compact fuel-to-air heat exchanger, as set forth in claim 3, wherein said heat exchanger is configurated in an endless annular form of 360°.

5. A compact fuel-to-air heat exchanger, as set forth in claim 4, wherein said 360° annular formed heat exchanger four identical, interconnected, arcuate, and individually replaceable modules of 90° each.

* * * * *